E. B. CADE.
MEASURING DEVICE.
APPLICATION FILED MAY 6, 1919.
1,405,754.
Patented Feb. 7, 1922.
3 SHEETS—SHEET 2.
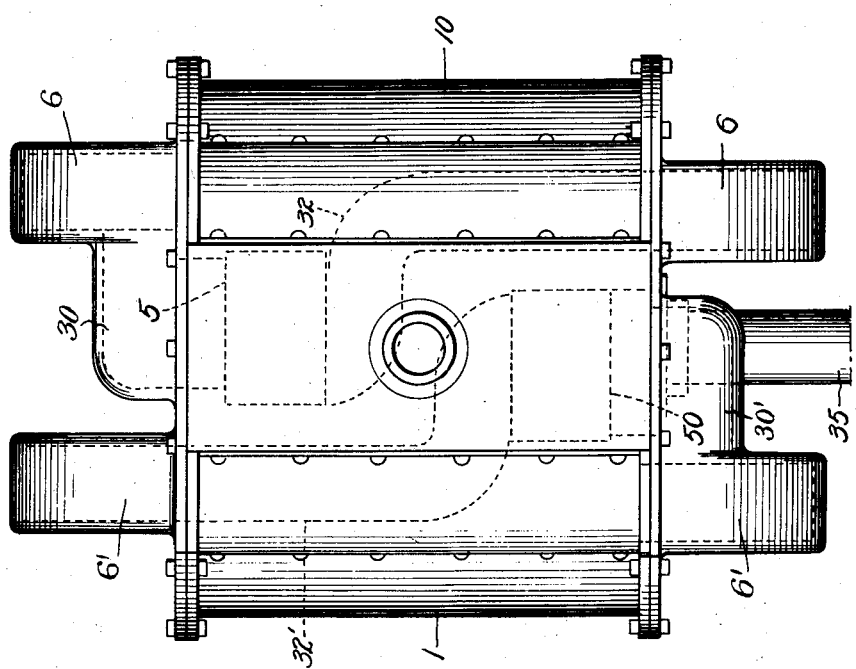
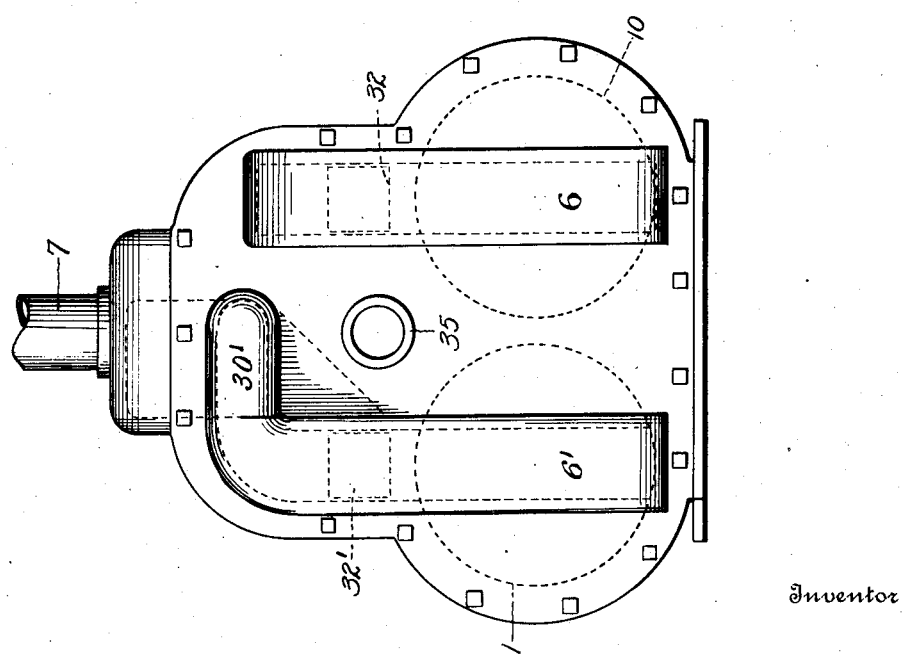
Inventor
Enos B. Cade
By Reynolds Cook.
Attorney E. B. CADE.
MEASURING DEVICE.
APPLICATION FILED MAY 6, 1919.
1,405,754.
Patented Feb. 7, 1922.
3 SHEETS—SHEET 3.
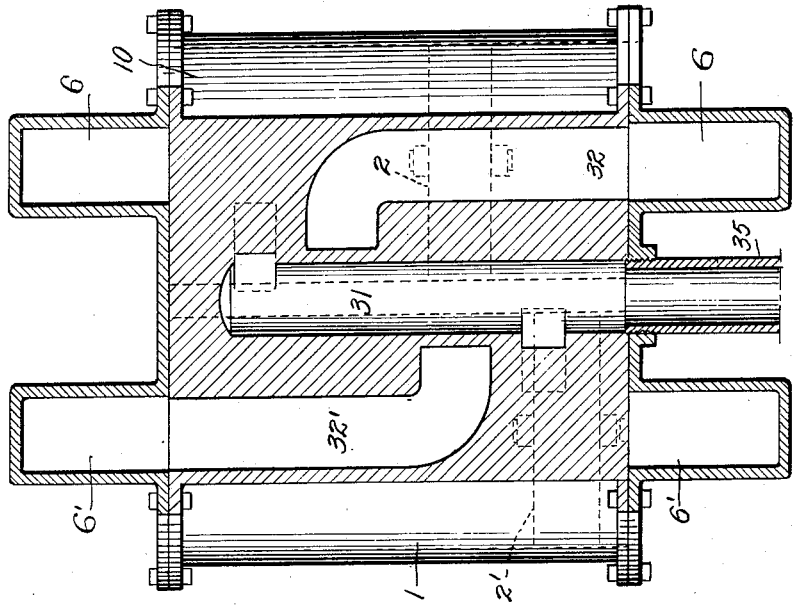
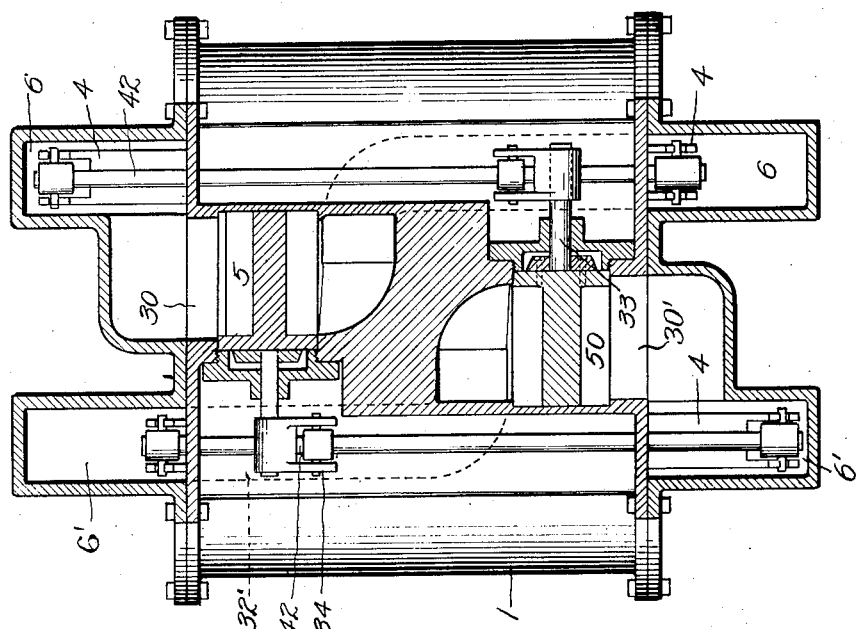
Inventor
Enos B. Cade
By Reynolds & Cook.
Attorney

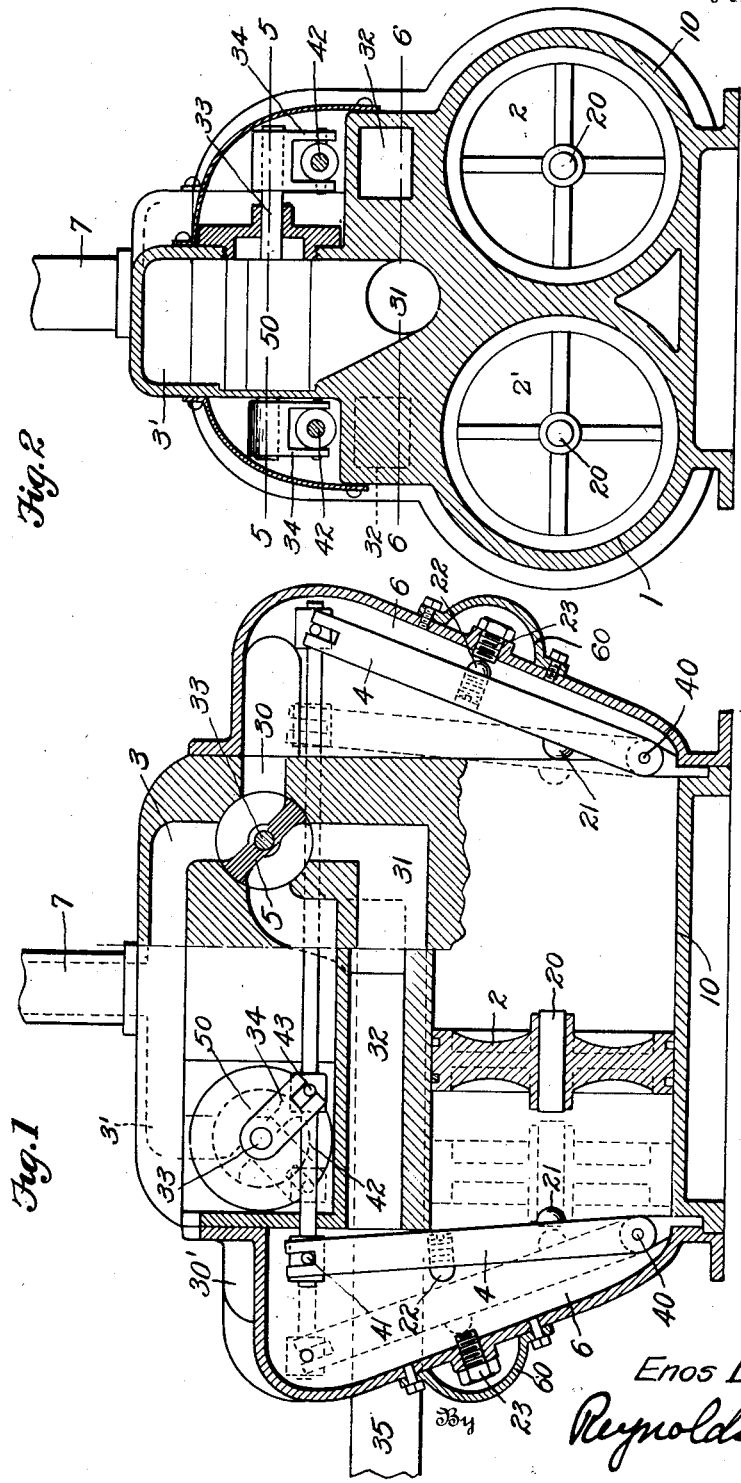

UNITED STATES PATENT OFFICE.

ENOS BENJAMINE CADE, OF SEATTLE, WASHINGTON.

MEASURING DEVICE.

1,405,754.   Specification of Letters Patent.   Patented Feb. 7, 1922.

Application filed May 6, 1919. Serial No. 295,166.

*To all whom it may concern:*

Be it known that I, ENOS B. CADE, a citizen of the United States, and resident of the city of Seattle, county of King, and State of Washington, have invented certain new and useful Improvements in Measuring Devices, of which the following is a specification.

My invention relates to metering devices intended for use in measuring the quantity of a fluid which is delivered.

The object of my invention is to provide a device for measuring fluids which will be accurate, simple and capable of a considerable capacity and one which may be readily adjusted in very small amounts, so as to insure accuracy, even under conditions of variation in temperature which are likely to produce expansion in the material of the meter at a different rate from that produced in the liquid being metered.

My invention consists of the novel features of construction which have been illustrated in the drawings and which will be defined in detail in the claims.

The accompanying drawings illustrate the operation of my invention and the type of construction which I now prefer to use.

Figure 1 is a vertical longitudinal section taken through one of the cylinders and its piston with, however, a portion of the upper part offset to one side to better illustrate the relations of the valves and ports.

Figure 2 is a transverse vertical section.

Figure 3 is an end elevation.

Figure 4 is a plan view.

Figure 5 is a section taken on the plane indicated by the line 5—5 of Figure 2.

Figure 6 is a section taken on the plane indicated by the line 6—6 of Figure 2.

In constructing this meter, two cylinders are employed, each being provided with a floating piston, which cylinders for convenience of construction are arranged side by side. A valve and port system is employed in which the valve for one cylinder is operated by the piston in the other cylinder, by which expedient it is possible to insure certainty of action and no possibility of there being such a neutral position as would cause the device to stop. The two cylinders 1 and 10 are herein shown made as an integral part of the same casting. These lie close alongside each other. The pistons 2 are floating pistons, that is, they are not provided with a piston rod which extends outside the cylinders, but are free in the cylinders.

The valves employed for controlling the supply and discharge of the liquid to and from these cylinders are herein shown as being rotative valves, of which one valve, 5, is shown in section in Figure 1 and the other, 50, is shown by an external end view in which the operating mechanism is illustrated. As the operating mechanism for each valve is identical, parts being merely reversed in position, I shall describe that for one valve, 5, in connection with cylinder 10, only. It will be understood that the construction of the operating mechanism for valve 50, moving in cylinder 1, is in all respects similar to the construction described.

The chamber in which this valve is seated is provided with four ports. The port 3 is the supply port through which liquid is delivered to the valve 5 and through this valve to the cylinder 10. The port 30 is the one through which the liquid passes to and from one end of the cylinder.

The port 31 is the discharge port through which the liquid passes after being discharged from the meter and the port 32 is another port through which the liquid is passed from the valve to the other end of the cylinder and then returned for discharge. The valve is provided with two ports so that it is what is called a four-way valve. The angle of movement of this valve, in the device as herein illustrated, is approximately 90°.

The valve has a stem 33 which extends outside the valve chamber. This stem is provided with a crank arm 34 which is engaged by a pin 43 carried by valve operating rod 42. This rod extends lengthwise of the device and parallel with the axis of the cylinder. It projects at each end and is adapted to be connected at its ends with the two valve rods 4, through which it is operated by the movement of the pistons 2.

The head of the cylinder is provided with outwardly projecting walls forming chambers 6, of which one is provided at each end of the cylinder. These chambers are in free communication with the interior of the cylinder and serve as passages for the flow of the liquid to and from the cylinder. The port 32 leading from the valve to one end of the cylinder connects with such chamber at one end of the cylinder while the port 30 connects with the like chamber at the opposite end. The exhaust port 31 connects with the discharge pipe 35.

The levers 4 are pivoted at 40, which is near the bottom of the chamber 6. Its upper end is connected with the rod 42. This is shown as secured by forming the end of the lever 4 as a yoke, which yoke embraces a pin 41 secured to and carried by the rod 42. The connection of the rod 42 with the valve arm 34 is provided by a similar expedient, namely, by forming slotted yokes in the end of the arm 34. The two levers 4 which are at opposite ends of the cylinder are connected with the rod.

The piston 2 is provided with a central bar 20 which is preferably of hardened steel and projects slightly beyond the outer portion of the piston. The lever 4 is also preferably provided with an inset 21 of hardened metal, in position to be contacted by the bar 20 of the piston. The purpose of making these two parts 20 and 21 as separate pieces from the piston and levers, is merely to secure better wearing qualities. The manner of inserting these may be any which is suitable.

The lever 4 is also shown as provided with another hardened insert 22, located in position to contact with an adjustable stop 23, in the form of a threaded bolt which extends through the outer wall of the chamber 6. These two parts 22 and 23 serve as stops to limit the outward swing of the lever 4. The bolt 23 extending through the wall of the chamber 6, may be engaged from without the device and adjusted, and in this way the capacity of the meter may be regulated by very small amounts and great accuracy of operation thus be secured and adjustment made to compensate for differences caused by differences in the expansion coefficients of the metal and the liquid.

The port 32, for the greater part of its length, is over the cylinder with which it communicates. At one end, however, it is offset laterally and upwardly, so as to get in the center line of the device. The liquid is supplied to the device through a pipe 7, which communicates directly with the port 3. The adjusting bolt 23 is protected and covered by a cap 60, which may be readily removed.

The operation of my device is as follows. In the position of parts shown in Figure 1 the liquid enters the port 3 and passes through one side of valve 5 into port 30 to chamber 6, forcing piston 2 in cylinder 10 to the left. The liquid at the left of this piston in the cylinder 10 and chamber 6 is forced into port 32 at the end of which it is delivered upwardly, the fluid then passing through the remaining side of valve 5 to port 31, connecting with the discharge pipe 35. Nearing the completion of its stroke the central bar 20 at the left of piston 2, engages with inset 21 on lever 4 moving said lever until it is stopped by the inwardly projecting end of bolt 23. Lever 4, through its engagement by means of operating rod 42 with crank arm 34, reverses the valve 50, the crank arm 34 being secured to the valve stem 33.

At the completion of the above operation fluid from inlet 7 passes into port 3' through one side of valve 50 into port 30' and then through the left hand chamber 6' forcing piston 2' to the right. Fluid at the right of said piston is forced out of cylinder 1 and chamber 6' at the right into port 32' and then into port 31' to discharge pipe 35. While the piston 2' is moving to the right valve 5 remains open, and fluid pressure through the ports described above operates against piston 2 which has reached the limit of its stroke to hold it in this position.

When the piston 2', through its engagement with valve 5, shifts the same, fluid passes into port 3 through the other side of valve 5 into port 32 and chamber 6 and forces piston 2 to the right. The fluid on the right of piston 2 is discharged through cylinder 10, chamber 6, port 30 at the right into port 32 and 31 to discharge pipe 35. During the reverse movement, or movement to the left of piston 2, piston 2' is held at the right limit of its stroke, until piston 2 reverses the position of valve 50, allowing piston 2' to be reversed.

What I claim as my invention is:

1. A liquid meter comprising two cylinders, a floating piston in each cylinder, a four-way valve and port system for each cylinder, a lever pivoted at each end of each cylinder and adapted to be actuated by the pistons, and means for operatively connecting the said levers of each cylinder with the valve of the other cylinder.

2. A liquid measuring device comprising two cylinders, a floating piston in each cylinder, a valve and port system for each cylinder, cylinder heads having chambers therein open to the cylinder chamber and extending in one direction beyond the margin of the cylinder chamber, and levers within said chambers in the cylinder heads and engaged by the pistons to move them, said levers of each cylinder being operatively connected with the valve which controls flow to and from the opposite cylinder.

3. A liquid measuring device comprising two cylinders, floating pistons therein, cylinder heads having chambers therein extending in one direction beyond the margin of the cylinder bore, levers within said chambers, means for directly operating said levers by the pistons, means controllable from without the heads for adjusting the stroke of said pistons, rods connecting the swinging ends of the levers of each cylinder, and a valve controlling the fluid to and from each cylinder connected to and operated by the rod of the other cylinder.

4. A liquid measuring device comprising two cylinders, a floating piston in each cylinder, a valve and port system for each cylinder, operating means for said valves including levers pivoted at the ends of the cylinders and adapted to be engaged and moved by the pistons, and adjustable stops for said levers passing through the cylinder heads and adapted to limit the movement of the pistons.

5. A liquid measuring device comprising two cylinders located alongside each other, a piston in each cylinder, a four-way rotative valve for each cylinder having its axis extending transversely of the length of the cylinders, an operating rod for each valve extending lengthwise of but without the cylinders, cylinder heads having chambers therein extending diametrically across the cylinders and beyond the margins of the cylinder bores to include the ends of the valve operating rods; and levers pivoted in said chambers having actuating engagement with the said valve operating rods and adapted to be actuated by the pistons.

Signed at Seattle, Washington, this 28th day of April 1919.

ENOS BENJAMINE CADE.